J. F. TRITLE.
SYSTEM AND APPARATUS FOR MOTOR CONTROL.
APPLICATION FILED JAN. 24, 1921.
1,434,758.
Patented Nov. 7, 1922.
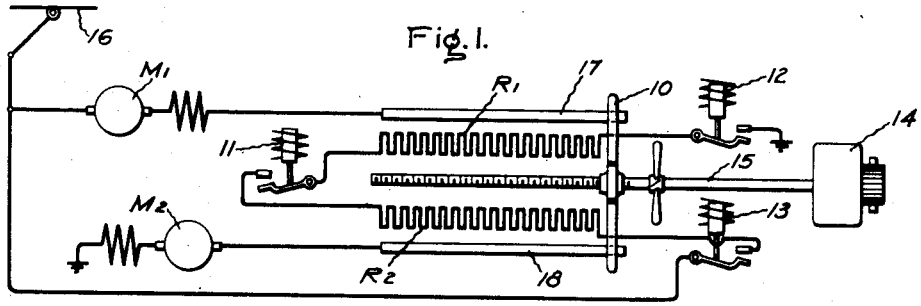
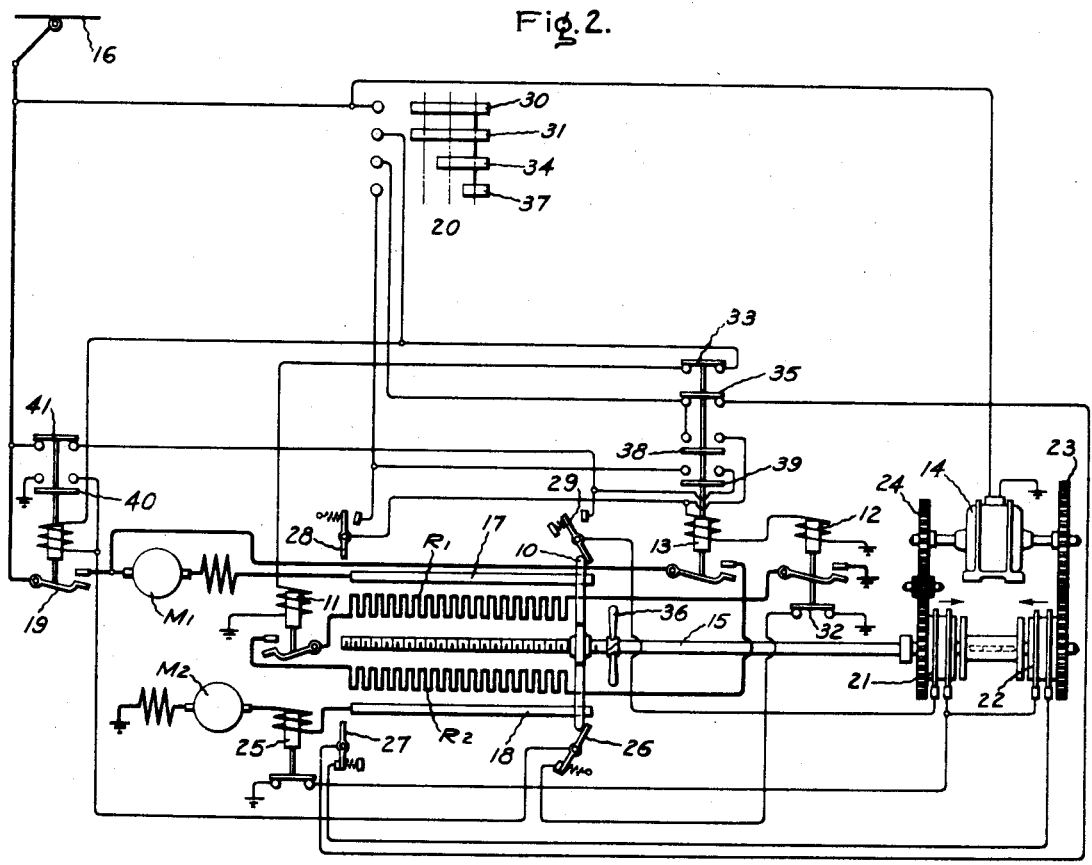
Inventor:
John F. Tritle,
by Albert G. Davis
His Attorney.

Patented Nov. 7, 1922.

1,434,758

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

SYSTEM AND APPARATUS FOR MOTOR CONTROL.

Application filed January 24, 1921. Serial No. 439,379.

*To all whom it may concern:*

Be it known that I, JOHN F. TRITLE, a citizen of the United States, residing at Schenectady, county of Schenectady, State of New York, have invented certain new and useful Improvements in Systems and Apparatus for Motor Control, of which the following is a specification.

My invention relates to the control of electric motors, and it provides improved means whereby the motors are started and stopped and generally controlled in a safe, reliable and efficient manner.

In certain of its aspects, my invention involves the use of a suitable means, such as a pilot motor, for operating a contact mechanism to vary starting resistance and thereby govern the acceleration of the controlled motor or motors. The movement of the contact mechanism in one direction gradually excludes the resistance from the motor circuit and the return movement gradually excludes the resistance with the motors connected in a different relation.

Although not necessarily limited thereto, my invention has a particular usefulness in the control of a plurality of motors which are operated in series relation part of the time and at other times in parallel relation.

In accordance with the invention when used in a series-parallel control, sections of the starting resistance are first connected in series with the motors in series, and the contact making device is operated to gradually exclude the resistance and then the motors are connected in parallel with a portion of the resistance in each parallel circuit. A return operation of the contact mechanism gradually excludes the resistance in the motor circuits. Time is saved by reason of the fact that it is not necessary to return the contact mechanism to the off or starting position before connecting the motors in the parallel relation, and by reason of the fact that when the full parallel position is reached, the contact mechanism is in the proper position to again begin series acceleration.

Another feature of the invention resides in the provision of an arrangement whereby in case of the failure of the interlocking means, ordinarily provided for effecting the opening of the series relation of the motors upon the establishment of the parallel, a short circuit will not be established across the source of supply. A plurality of multiple paths will be established, each of which will have a substantial resistance.

My invention has features of simplicity of construction and arrangement which will be pointed out partcularly hereinafter.

For a better understanding of my invention, reference is had to the acompanying drawings wherein I have illustrated in simplified form an embodiment of my invention for purposes of illustration, and in which Fig. 1 is a simplified diagram of the main motor circuits for the purpose of obtaining a general understanding of the invention, and Fig. 2 is a simplified diagram of a motor control arrangement embodying the arrangement of Fig. 1.

Referring to the drawings, the electric motors $M^1$ and $M^2$ are adapted to be accelerated and generally controlled by means of two resistors $R^1$ and $R^2$. The contact mechanism 10 is adapted to control the resistors so as to gradually and simultaneously exclude the resistors from the motor circuits. A contactor 11 is provided for connecting the resistors and the motors in series relation, and the contactors 12 and 13 are provided for connecting the motors in parallel relation with the resistor $R^1$ included in the circuit of motor $M^1$ and the resistor $R^2$ in circuit with the motor $M^2$. A pilot motor 14 operating a screw shaft 15 is provided for moving the contact mechanism 10 back and forth so as to vary the resistors and thereby control the acceleration of the motors.

Before describing the more complete motor control system disclosed in Fig. 2, certain features of the invention will be pointed out in a brief description of the operation of the simplified arrangement of Fig. 1. With the contactor 11 closed and the parts in the various positions as shown in Fig. 1, assume that the pilot motor 14 is energized to move the contact mechanism 10 toward the left, thereby connecting the motors in series relation with the resistors in series relation in the circuit, the circuit being from the trolley wire 16, motor $M^1$, contact strip 17, to the upper insulated section of the contact mechanism 10, resistor $R^1$, contactor 11, resistor $R^2$, lower insulated section of the contact mechanism 10, contact strip 18, through the motor $M^2$ to ground. As the contact mechanism 10 moves toward the left, driven by the pilot motor 14, the resistors $R^1$ and $R^2$ are gradually and simultaneously excluded from the motor circuit until finally the motors are connected in full series relation with the resistors entirely excluded from the motor circuit. If now the contactor 11 be opened and the contactors 12 and 13 be closed, the motors are connected in parallel relation with a resistor in each motor circuit. Thus the circuit from motor $M^1$ is through the contact segment 17, resistor $R^1$, contactor 12 to ground, and the circuit for motor $M^2$ is from the supply conductor through contactor 13, resistor $R^2$, the lower insulated section of contact mechanism 10, contact strip 18, through motor $M^2$ to ground. The reversal of the pilot motor and the consequent return movement of the contact mechanism will now gradually and simultaneously exclude the resistors from the motor circuits until the motors are connected in parallel directly across the supply circuit with all of the resistors excluded. It will be observed that as soon as the contact mechanism 10 has completed its movement to the left in cutting out the resistors in series relation, it is in the proper position to begin cutting out the resistors for parallel operation. Time is thereby saved, since it is not necessary to return the contact mechanism to the initial position before starting parallel operation. It will also be observed that as soon as the contact mechanism has completed its movement to the right, the contact mechanism is in the proper position to again begin the series acceleration of the motors. It will also be observed that the acceleration of the motors will be accomplished with a great number of acceleration steps.

Referring to Fig. 2, in which similar reference characters and numerals designate similar parts, the line contactor 19 is provided for connecting the motors to the supply circuit and the various contactors are controlled by means of the master switch 20 having a plurality of operative positions. The pilot motor 14 in this embodiment of my invention is adapted to be operated in one direction instead of as in Fig. 1, in which the pilot motor is intended to be reversed so as to cause a reverse movement of the contact mechanism 10. The screw shaft 15, along which the contact mechanism 10 is adapted to fleet back and forth, is operated from the pilot motor 14 through gearing in response to the energization of either the electromagnetic clutch 21 or the electromagnetic clutch 22. When the clutch 22 is energized, the shaft 15 is connected to the pilot motor through the gearing 23 so as to operate the contact mechanism toward the left, and the clutch 21 is adapted to connect the shaft 15 to the pilot motor through the reduction gearing 24 so as to return the contact mechanism to the position shown in the drawings. A current limit relay 25 having switch contacts in the circuit of the electromagnetic clutches is provided for limiting the rate at which the contact mechanism cuts out the starting resistors responsively to the current taken by the motors. The limit switch 26 is provided for insuring that the line contactor 19 cannot be closed unless the contact mechanism 10 is in its right hand position, viz, that in which the motors are connected in series relation with the resistors in series relation. The limit switch 27 is provided for insuring that the electromagnetic clutch 22 will be deenergized to prevent further movement of the contact mechanism toward the left after the resistors have been entirely excluded from the series circuit. The limit switch 28 is provided for automatically energizing the contactors 12 and 13 when the contact mechanism 10 is in its left hand position, so as to thereby connect the motors in parallel relation. The limit switch 29 is provided for insuring that the electromagnetic clutch 21 will be deenergized when the contact mechanism 10 has completed its movement toward the right, viz, that shown in the drawing.

As thus constructed and arranged, and with the various parts in the positions shown in the drawings, the operation of my invention is briefly as follows:—Turning the master controller toward the left to its first operative position, energizes the line contactor 19 to close and also energizes the contactor 11 to close and thereby establish the series connection for the motor. The coil circuit for the line contactor 19 is as follows: from the trolley wire 16 through the segments 30 and 31 of the master controller 20, the coil of contactor 19, limit switch 26 and the auxiliary switch 32 of the contactor 12. The coil of contactor 11 is energized through the upper auxiliary switch 33 of contactor 13. The motors are now connected in series relation across the supply circuit with the resistors $R^1$ and $R^2$ connected in series in the motor circuit. Moving the master switch 20 to its second operative position energizes the electromagnectic clutch 22 through the segment 34 of the master switch, the auxiliary switch 35 of the contactor 13, the limit switch 27, through the winding of the electromagnetic clutch and the contacts of the current limit relay 25 to ground. The shaft 15 is now connected so as to be driven from the right hand end of the shaft of pilot motor 14, and this shaft turning will cause the contact mechanism to fleet along the screw shaft toward the left, thereby cutting out the resistors $R^1$ and $R^2$ gradually and simultaneously from the motor circuit. A fan 36 mounted on the shaft 15 is provided for limiting and regulating the speed of the shaft and also for setting up air currents to cool the starting resistors. In case the starting resistors are cut out too quickly, the current limit device 25 will operate to open the circuit of the electromagnetic clutch 22 and thereby stop the acceleration until the motor current has dropped to the predetermined value. The acceleration of the motors will proceed in this manner until the resistors have been entirely excluded from the motor circuit and the contact mechanism 10 is in its left hand position, at which the limit switch 28 is closed and the limit switch 27 is opened. The opening of the limit switch 27 will deenergize the electromagnetic clutch 22 and prevent a continuation of the movement of the contact mechanism 10 toward the left. It will be observed that when the contact mechanism moves out of its right hand position so as to gradually cut out the starting resistors for the series relation of the motors, the limit switch 29 is closed and the limit switch 26 is automatically opened.

The contact mechanism 10 will remain in the full series position until the master switch 20 has been moved to its third operative position at which the contactors 12 and 13 are energized to close through the segment 37 of the master switch, the limit switch 28, through the coils of contactors 13 and 12 to ground. The closing of the contactors 12 and 13 establishes momentarily a bridging circuit for the motors which serves as a transition position between the connection of the motors in series and in parallel. The closing of the contactor 13, however, opens the auxiliary switch 33 and thereby deenergizes the series connection of the contactor 11 so that the motors will be connected in parallel across the supply circuit with the resistor $R^1$ in circuit with motor $M^1$ and the resistor $R^2$ in circuit with motor $M^2$. Contactor 13 in closing establishes a maintaining circuit for itself and the contactor 12 through the auxiliary switch 38 so that the opening of the limit switch 28 when the contact mechanism 10 turns toward the right does not effect the opening of the contactors 12 and 13. With the master controller in the third operative position, the electromagnetic clutch 21 is energized through the segment 37 of the master switch, the auxiliary switch 39 of the contactor 13, the limit switch 29, the coil of the electromagnetic clutch through the current limit relay contacts to ground. The pilot motor will now move the contact mechanism toward the right, thereby gradually and simultaneously excluding the resistances $R^1$ and $R^2$ from their respective motor circuits until the resistors had been all excluded from the circuits. The limit switch 29 is thereupon operated to automatically deenergize the electromagnetic clutch 21 and prevent a further movement of the contact mechanism toward the right.

The master switch 20 can be thrown directly to the full parallel position and the motors will be automatically accelerated through the series position to the full parallel position under the control of the current limit relay 25. If at any time it is desired to arrest the acceleration of the motors, the master switch is returned to the first operative position at which the electromagnetic clutches are deenergized and the pilot motor disconnected from the shaft 15. It will also be observed that when there is a failure of voltage, the line contactor 19 will open and the maintaining circuit for the contactor winding through the auxiliary switch 40 is broken, so that the contact mechanism 10 must be returned to the right hand position so as to close the limit switch 26 and thereby permit the energization of the line contactor through the circuit previously traced. The auxiliary switch 32 on the parallel connection contactor 12 insures that the line contactor 19 cannot be reclosed after opening until the parallel connection for the motors has been opened. The upper auxiliary switch 41 on the line contactor 19 is closed when the contactor is opened and a circuit for the electromagnetic clutch 21 is completed through the limit switch 29. That insures that the pilot motor will automatically return the contact mechanism to the off or original position (that shown in the drawings) when the controller is turned to the off position.

It is well known that in electromagnetic series parallel control arrangements, a failure of mechanical or electrical interlocking devices on the various switches may cause the establishment of a short circuit from the trolley to ground, thereby damaging the apparatus. With my arrangement, either a motor will be connected between the trolley and ground, or the resistors will be connected between the trolley and ground, regardless of whether or not the various interlocking devices work as intended. Thus, assume that all of the interlocking or auxiliary switches fail to operate as intended and the limit switches also fail to operate as intended, the contactors 11, 13 and 12 may be simultaneously closed. Assuming that the contact mechanism 10 is in the position shown on the drawing, three multiple circuits will be established between the trolley and ground. One will be through the motor $M^1$, and contactor 12 to ground, another will be through contactor 13 and motor $M^2$ to ground and the third circuit will be through the contactor 13 and resistors R² and R¹, and contactor 12 to ground. If the contact mechanism is at its final position to the left or any intermediate position, more or less of the resistors will be included in the motor circuits and the resistors will still be connected in series across the supply circuit.

In accordance with the provisions of the patent statutes, I have described the principle of my invention, together with the apparatus which I now consider to represent the best embodiment thereof but I desire to have it understood that the apparatus is one illustrative and that the invention can be carried out by other means.

What I claim as new and desire to secure by Letters Patent of the United States, is,—

1. In a system of motor control, a plurality of motor controlling resistors, a contact mechanism for varying the resistors, switch mechanism for controlling the resistors, and connections whereby movement of the contact mechanism in one direction excludes the resistors connected in one relation with respect to each other and a return movement of the contact mechanism excludes the resistors connected in a different relation with each other.

2. In a system of motor control, a motor controlling resistance having a plurality of sections, a contact mechanism for controlling the resistance, and connections whereby a movement of the contact mechanism in one direction excludes the sections of resistance connected in series relation with respect to each other and a return movement of the contact mechanism excludes the sections of resistance in multiple connected paths.

3. In a system of motor control, a plurality of motors, a resistance for controlling the motors, contact mechanism for controlling the resistance, means for connecting the motors in series and in parallel relation, and connections whereby movement of the contact mechanism in one direction gradually excludes the resistance from the motor circuit with the motors in series relation and a return movement of the contact mechanism gradually excludes the resistance from the motor circuits with the motors in parallel relation.

4. In a system of motor control, a plurality of motors, a plurality of resistors for controlling the motors, contact mechanism for controlling the resistors, means for connecting the motors in series relation with the resistors in series and in parallel relation with a resistor in each motor circuit, and connections whereby movement of the contact mechanism in one direction with the motors in series relation gradually cuts out a portion of each resistor simultaneously and a return movement of the contact mechanism with the motors in parallel relation gradually and simultaneously excludes the resistors from the motor circuits.

5. In a system of motor control, a plurality of motors, a plurality of resistors for controlling the motors, switch mechanism for connecting the resistors in series with the motors in series and the motors in parallel with a resistor in each branch of the parallel circuit, contact mechanism for controlling the resistors, and connections whereby movement of the contact mechanism with the motors in series relation gradually and simultaneously excludes the resistors from the motor circuit until the resistors have been excluded therefrom and then automatically operates the switch mechanism to connect the motors in parallel with a resistor in each motor circuit so that a return movement of the contact mechanism gradually and simultaneously excludes the resistors from the motor circuits.

6. In a system of motor control, a plurality of motors, a plurality of resistors for controlling the motors, switch mechanism for connecting the resistors in series with the motors in series and the motors in parallel with a resistor in each branch of the parallel circuit, a master controller for controlling the switch mechanism, contact mechanism for controlling the resistors, a pilot motor for operating the contact mechanism, and connections whereby movement of the contact mechanism in one direction with the motors in series relation gradually and simultaneously excludes the resistors from the motor circuit until the resistors have been excluded therefrom and then automatically operates the switch mechanism to connect the motors in parallel with a resistor in each motor circuit so that a return movement of the contact mechanism gradually and simultaneously excludes the resistors from the motor circuits.

7. In a system of motor control, a plurality of motors, electromagnetically controlled means for connecting the motors in series or in parallel relation across a supply circuit, interlocking mechanism cooperating with the said electromagnetically controlled means for effecting the opening of the series relation circuit in response to the closing of the parallel relation circuit, and connections whereby upon the failure of the interlocking mechanism the establishment of a short circuit across the supply circuit is prevented.

8. In a system of motor control, a plurality of motors, electromagnetic switch mechanism for connecting the motors in series relation across a supply circuit, electromagnetic switch mechanism for connecting the motors in parallel relation across the supply circuit, interlocking means for opening the series relation when the parallel relation is established, and connections whereby upon the failure of the interlocking means, a plurality of relatively high resistance multiple circuits are established across the supply circuit.

9. In a system of motor control, a plurality of motors, a resistance for controlling the motors, an electromagnetic switch for connecting the motors in series relation across a supply circuit, a plurality of electromagnetic switches for connecting the motors in parallel relation across the supply circuit, interlocking means for opening the series relation switch when the parallel relation switches are closed, and connections whereby upon the failure of the interlocking means, the motors and the resistance are connected in parallel relation with each other across the supply circuit.

In witness whereof, I have hereunto set my hand this 22nd day of January, 1921.

JOHN F. TRITLE.